United States Patent
Chawla et al.

(10) Patent No.: US 10,264,059 B2
(45) Date of Patent: Apr. 16, 2019

(54) DETERMINING SERVER LEVEL AVAILABILITY AND RESOURCE ALLOCATIONS BASED ON WORKLOAD LEVEL AVAILABILITY REQUIREMENTS

(71) Applicant: INTERNATIONAL BUSINESS MACHINES CORPORATION, Armonk, NY (US)

(72) Inventors: Madhuri Chawla, Mississauga (CA); Manish Gupta, New Dehli (IN); Seshashayee S. Murthy, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 14/838,924

(22) Filed: Aug. 28, 2015

(65) Prior Publication Data
US 2017/0063973 A1 Mar. 2, 2017

(51) Int. Cl.
*H04L 29/08* (2006.01)
*H04L 12/24* (2006.01)

(52) U.S. Cl.
CPC ...... *H04L 67/1002* (2013.01); *H04L 41/0893* (2013.01); *H04L 41/5012* (2013.01)

(58) Field of Classification Search
CPC .................................................. G06F 11/3447
See application file for complete search history.

(56) References Cited

U.S. PATENT DOCUMENTS

| | | | |
|---|---|---|---|
| 7,146,353 B2 | 12/2006 | Garg et al. | |
| 7,516,221 B2 | 4/2009 | Souder et al. | |
| 8,756,307 B1* | 6/2014 | Chen | G06F 11/3414 709/223 |
| 8,924,561 B2 | 12/2014 | Brown et al. | |
| 9,021,094 B1* | 4/2015 | Zhou | G06F 9/5066 709/203 |
| 2006/0206619 A1 | 9/2006 | Dan et al. | |
| 2006/0277549 A1* | 12/2006 | Li | G06F 9/4812 718/104 |
| 2010/0114531 A1 | 5/2010 | Korn et al. | |
| 2011/0131309 A1 | 6/2011 | Akiyama et al. | |
| 2012/0102291 A1* | 4/2012 | Cherian | G06F 9/5044 711/170 |
| 2014/0101228 A1 | 4/2014 | Dalela | |
| 2014/0136690 A1 | 5/2014 | Jain | |
| 2014/0156813 A1* | 6/2014 | Zheng | H04L 67/16 709/220 |

\* cited by examiner

*Primary Examiner* — John M Macilwinen
*Assistant Examiner* — Christopher P Cadorna
(74) *Attorney, Agent, or Firm* — Schmeiser, Olsen & Watts; William H. Hartwell (57) ABSTRACT

An approach is provided for determining availabilities of servers in multiple tiers of a workload. Based on (1) a required availability of the workload, (2) resource requirements for redundancy groups (RGs) in the workload, (3) sets of server sizes, and (4) sets of availability categories, numbers of server(s) included in respective RGs are determined, allocations to the server(s) of one or more server sizes from a selected set of server sizes are determined, and allocations to the server(s) of one or more categories of availability from a selected set of categories is determined, so that a cost of achieving the required availability of the workload is minimized.

16 Claims, 3 Drawing Sheets

DETERMINING SERVER LEVEL AVAILABILITY AND RESOURCE ALLOCATIONS BASED ON WORKLOAD LEVEL AVAILABILITY REQUIREMENTS

TECHNICAL FIELD

The present invention relates to managing server availability in a cloud computing environment, and more particularly to determining server availability based on a workload level availability requirement.

BACKGROUND

A workload comprises a set of virtualized and/or non-virtualized servers, which have redundancies and dependencies among the servers. A workload is multi-tiered and has overall availability requirements and performance/throughput requirements at each tier. A user manually assigning server level availabilities which satisfy a workload level availability requirement in a cost-effective manner is inconvenient and difficult. Accordingly, there is a need to automatically determine server level availabilities so that the workload level availability requirement is achieved and the cost of achieving the workload level availability requirement is minimized.

BRIEF SUMMARY

In a first embodiment, the present invention provides a method of determining availabilities of servers in multiple tiers of a workload. The method includes a computer receiving a requirement of an availability of the workload that includes a plurality of redundancy groups (RGs). Each RG includes one or more of the servers. Each of the servers is included in exactly one corresponding RG included in the plurality of RGs. The method further includes the computer receiving resource requirements for respective RGs included in the plurality of RGs. The resource requirements are based on respective relative performance estimates of the servers. The method further includes the computer receiving sets of server sizes and sets of categories of availability. The server sizes include respective numbers of central processing units (CPUs) in the servers, respective sizes of data storage devices coupled to the CPUs, and respective sizes of memories coupled to the CPUs. The categories of availability are based on durations for which the servers are operational over a specified amount of time. The method further includes, based on the requirement of the availability of the workload, the resource requirements, the sets of server sizes, and the sets of availability categories, the computer determining numbers of server(s) included in respective RGs included in the plurality of RGs, selecting one of the sets of server sizes, determining allocations of one or more server sizes from the selected set of server sizes to the server(s) in each of the RGs, selecting one of the sets of categories of availability, and determining allocations of one or more categories of availability from the selected set of categories of availability to the server(s) in each of the RGs, so that a cost of achieving the requirement of the availability of the workload is minimized.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of determining availabilities of servers in multiple tiers of a workload. The method includes a computer system receiving a requirement of an availability of the workload that includes a plurality of redundancy groups (RGs). Each RG includes one or more of the servers. Each of the servers is included in exactly one corresponding RG included in the plurality of RGs. The method further includes the computer system receiving resource requirements for respective RGs included in the plurality of RGs. The resource requirements are based on respective relative performance estimates of the servers. The method further includes the computer system receiving sets of server sizes and sets of categories of availability. The server sizes include respective numbers of central processing units (CPUs) in the servers, respective sizes of data storage devices coupled to the CPUs, and respective sizes of memories coupled to the CPUs. The categories of availability are based on durations for which the servers are operational over a specified amount of time. The method further includes based on the requirement of the availability of the workload, the resource requirements, the sets of server sizes, and the sets of availability categories, the computer system determining numbers of server(s) included in respective RGs included in the plurality of RGs, selecting one of the sets of server sizes, determining allocations of one or more server sizes from the selected set of server sizes to the server(s) in each of the RGs, selecting one of the sets of categories of availability, and determining allocations of one or more categories of availability from the selected set of categories of availability to the server(s) in each of the RGs, so that a cost of achieving the requirement of the availability of the workload is minimized.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of determining availabilities of servers in multiple tiers of a workload. The method includes a computer system receiving a requirement of an availability of the workload that includes a plurality of redundancy groups (RGs). Each RG includes one or more of the servers. Each of the servers is included in exactly one corresponding RG included in the plurality of RGs. The method further includes the computer system receiving resource requirements for respective RGs included in the plurality of RGs. The resource requirements are based on respective relative performance estimates of the servers. The method further includes the computer system receiving sets of server sizes and sets of categories of availability. The server sizes include respective numbers of central processing units (CPUs) in the servers, respective sizes of data storage devices coupled to the CPUs, and respective sizes of memories coupled to the CPUs. The categories of availability are based on durations for which the servers are operational over a specified amount of time. The method further includes based on the requirement of the availability of the workload, the resource requirements, the sets of server sizes, and the sets of availability categories, the computer system determining numbers of server(s) included in respective RGs included in the plurality of RGs, selecting one of the sets of server sizes, determining allocations of one or more server sizes from the selected set of server sizes to the server(s) in each of the RGs, selecting one of the sets of categories of availability, and determining allocations of one or more categories of availability from the selected set of categories of availability to the server(s) in each of the RGs, so that a cost of achieving the requirement of the availability of the workload is minimized.

Embodiments of the present invention automatically assign individual server level availabilities and resource allocations so as to minimize the overall cost of achieving given workload level availability requirements. In one embodiment, the solutions to an optimization problem that provide the server level availabilities are Pareto efficient solutions.

DETAILED DESCRIPTION

Overview

Embodiments of the present invention provide a high availability (HA) optimizer that automatically assigns server level availability categories and server sizes (e.g., t-shirt sizes) given higher level requirements such as a workload level (i.e., application level) availability requirement. The HA optimizer assigns the server level availability categories so as to minimize a cost of achieving the higher level requirements. The cost being minimized may be a vector of conflicting cost elements or a linearized overall cost. In one embodiment, the aforementioned assigned server sizes are t-shirt sizes, which are described below.

Cloud computing service providers (i.e., Infrastructure as a Service (IaaS) providers) (also referred to herein as cloud sites) provide respective sets of options for server availability categories and t-shirt sizes. For example, a service provider may provide a cloud computing environment having (1) Bronze, Silver, Gold, and Platinum categories of server level availability and (2) small, medium, large, and x-large (i.e., extra-large) t-shirt sizes, which are server size options for servers. The t-shirt sizes are also called (1) "flavors" in the terminology of the OpenStack® cloud computing software platform or (2) resource sizes. OpenStack is a registered trademark of the OpenStack Foundation located in Austin, Tex. Although embodiments presented herein are described with reference to "t-shirt sizes," other sets of server sizes may be substituted for t-shirt sizes.

Avoiding the inconvenience of a user manually assigning individual server level availabilities to satisfy an application level availability requirement and avoiding the difficulty in completing the assignments of server level availabilities in a cost-effective manner are unique challenges that are overcome by one or more embodiments of the present invention, which advantageously achieve an application level availability requirement in response to an automatic assignment of server level availability categories based on (1) performance requirements for redundancy groups that include the servers and (2) the available t-shirt sizes and availability categories provided as options by cloud sites for each redundancy group. In one embodiment, the user easily and conveniently associates an availability requirement to a workload without the user associating availability requirements at the level of the servers that constitute the workload. The user-supplied workload level availability requirement, cloud provider-supplied server level service level agreement (SLA) availability categories and resource sizes (i.e., t-shirt sizes), and other constraints are the bases for computing the availability for individual servers in the workload to satisfy the workload availability requirement.

A workload consists of multiple redundancy groups. A redundancy group RG included in the workload consists of n identical servers, where n≥1. Two redundancy groups in a workload may have the same number of servers or different numbers of servers. Each redundancy group in a workload is associated with respective start/stop scripts for software. A redundancy group is available as long as m servers out of the n servers in the redundancy group are available. If f is the probability of failure for a virtual machine (VM) then the expression (1) presented below specifies the unavailability of the redundancy group:

$$\Sigma_{\{i \geq m\}n} C_i f^i (1-f)^{n-i} \qquad (1)$$

The unavailability of one or more redundancy groups causes an unavailability of the workload. Embodiments of the present invention receive a specification of the amount of total computing resources required in a given redundancy group in the workload.

A server in a redundancy group is active if the server processes application level requests. For example, in a WebSphere® Application Server Network Deployment (WAS ND) application server level cluster, all server members of a redundancy group are actively processing application level requests, which indicates that all the servers in the redundancy group are active. WebSphere is a registered trademark owned by International Business Machines Corporation located in Armonk, N.Y. As another example, if a redundancy group models a high availability disaster recovery (HADR) type of a configuration, then only one database instance is active while the other one is inactive, passive, or on standby. The inactive instance is not actively participating in the application level requests, but it may still process a read-only workload.

In one or more embodiments, if a redundancy group has inactive servers, then the inactive servers are mirror copies of active servers in the redundancy group, or alternatively, the resource allocations and availability SLAs for the inactive servers can be determined from knowledge of the resource allocations and availability SLAs for the active servers in the redundancy group.

Figure 1:
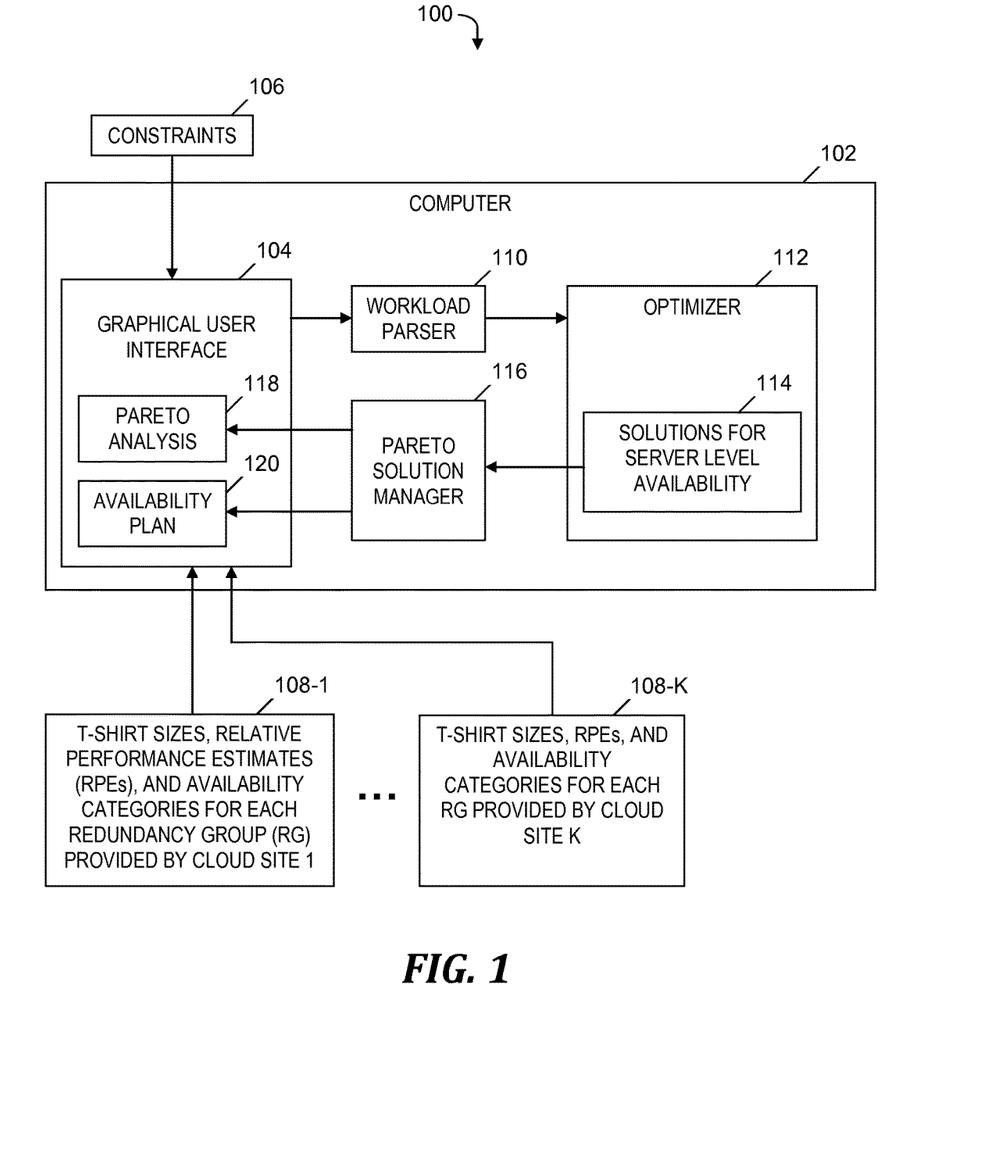
FIG. 1 is a block diagram of a system for determining availabilities of servers in multiple tiers of a workload, in accordance with embodiments of the present invention.

System for Determining Server Level Availability Based on a Workload Level Availability Requirement FIG. 1 is a block diagram of a system 100 for determining availabilities of servers in multiple tiers of a workload, in accordance with embodiments of the present invention. System 100 includes a computer 102 which includes a graphical user interface (GUI) 104. GUI 104 receives constraints 106 provided by a user (e.g., customer administrator) or another system (not shown). In one embodiment, constraints 106 include a requirement of an availability of a workload (i.e., workload availability requirement; also known as a workload level availability requirement) and minimum throughput or resource requirements for respective redundancy groups (not shown) included in the workload. Alternatively, constraints 106 may be received by computer 102 as a Topology Orchestration for Cloud Applications (TOSCA) template or a Heat Orchestration Template (HOT).

System 100 includes information 108-1, ..., 108-K, which is accessed via GUI 104 from K respective cloud computing service provider sites 1, ..., K (not shown), where K is an integer greater than one. Information 108-1 includes t-shirt sizes, relative performance estimates (RPEs), and options for availability categories for each redundancy group in the workload, as provided by a first cloud site (i.e., a site of a first cloud computing service provider) and information 108-K includes t-shirt sizes, RPEs, and availability categories for each redundancy group in the workload, as provided by a K-th cloud site. T-shirt sizes indicate numbers of central processing units (CPUs) in the servers in each redundancy group, sizes of memories coupled to the CPUs, and sizes of data storage devices coupled to the CPUs. RPEs are relative server performance estimates or minimum capacities required to exist in the servers in respective redundancy groups. In one embodiment, each cloud site is an IaaS cloud site.

Computer 102 includes a software-based workload parser 110, which parses out the workload level availability requirement, and the t-shirt sizes, RPEs, and options for availability categories received from each cloud service provider site. Workload parser 110 sends the parsed information to a software-based optimizer 112. Optimizer 112 utilizes scalar objective function or a vector objective function to generate solutions 114 for the server level availability categories and t-shirt sizes. The objective function utilized by optimizer 112 is based on the parsed information that optimizer 112 receives from workload parser 110. Standard objective functions may be part of optimizer 112 or objective functions may be input to system 100 by a user.

Optimizer 112 sends solutions 114 to a software-based Pareto solution manager 116 included in computer 102. Pareto solution manager 116 analyzes solutions 114 and generates graph(s), diagram(s), and/or chart(s) in a Pareto analysis 118, which is presented via GUI 104. A user may review Pareto analysis 118 to compare the different solutions 114 to determine whether Pareto dominance exists and to decide whether to request optimizer 112 to refine one of the solutions 114. Through iterative refinements of solutions 114, Pareto solution manager 116 generates a best solution indicating an availability plan 120, which indicates a cloud site to host the workload, the total number of servers within each redundancy group, t-shirt sizes to be allocated to the server(s) in each of the redundancy groups, and availability categories to be allocated to the server(s) in each of the redundancy groups. By allocating the t-shirt sizes and availability categories included in the best solution to the server(s) in each redundancy group, the workload availability requirement is achieved and the cost of achieving the workload availability requirement is minimized. Availability plan 120 also specifies a number of servers in a subset of the total number of servers in each redundancy group, where the number of servers in the subset must be available in order for the corresponding redundancy group to be considered available.

In one embodiment, Pareto solution manager 116 generates solutions 114, which are Pareto optimal solutions, by solving an integer linear programming or non-linear programming optimization problem utilizing heuristics (not shown) (e.g., linear programming relaxation, simulating annealing, Monte Carlo approach, branch and bound, etc.).

In one embodiment, Pareto solution manager 116 receives a user-supplied solution to the aforementioned optimization problem and utilizes heuristics to compute a solution that is superior to the user-supplied solution.

Figure 2:
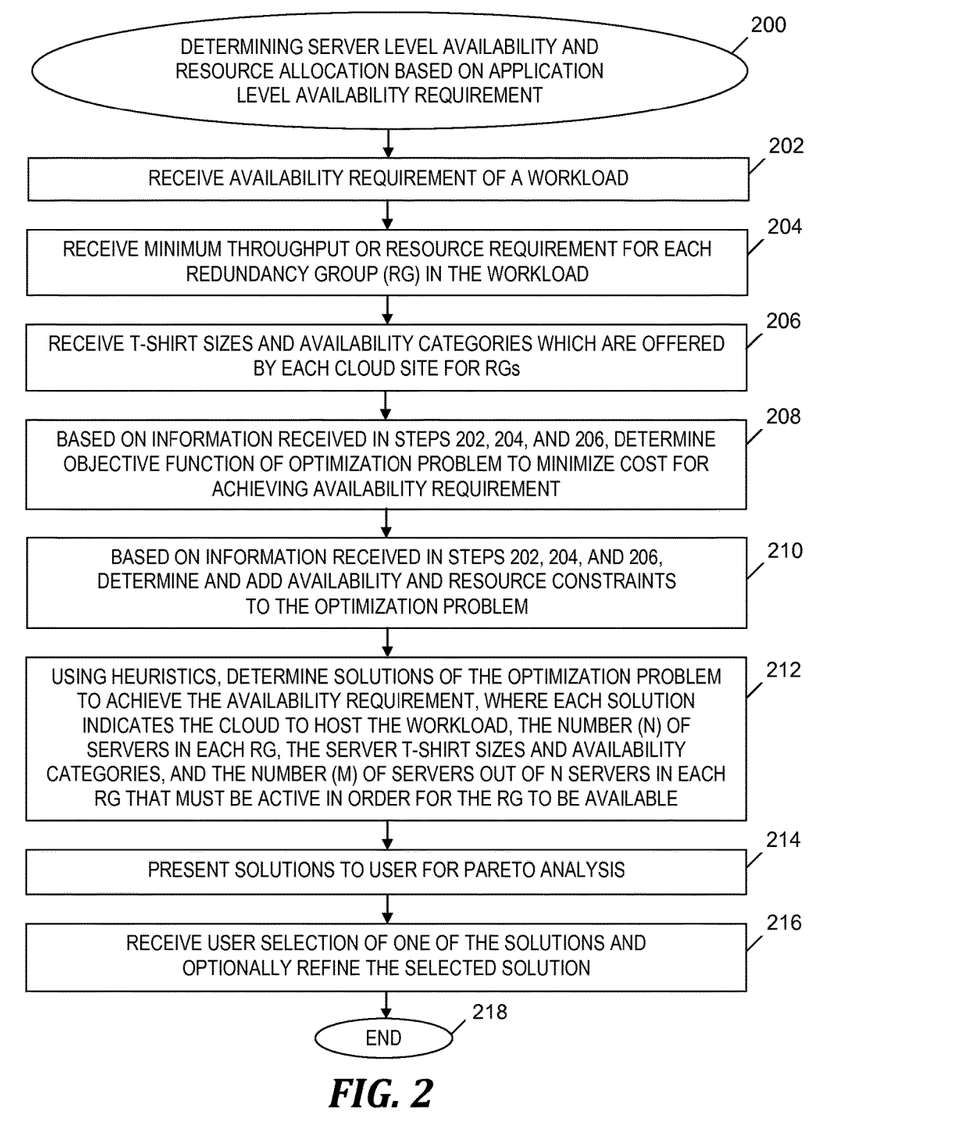
FIG. 2 is a flowchart of a process of determining availabilities of servers in multiple tiers of a workload, where the process is implemented in the system of FIG. 1, in accordance with embodiments of the present invention.
Figure 3:
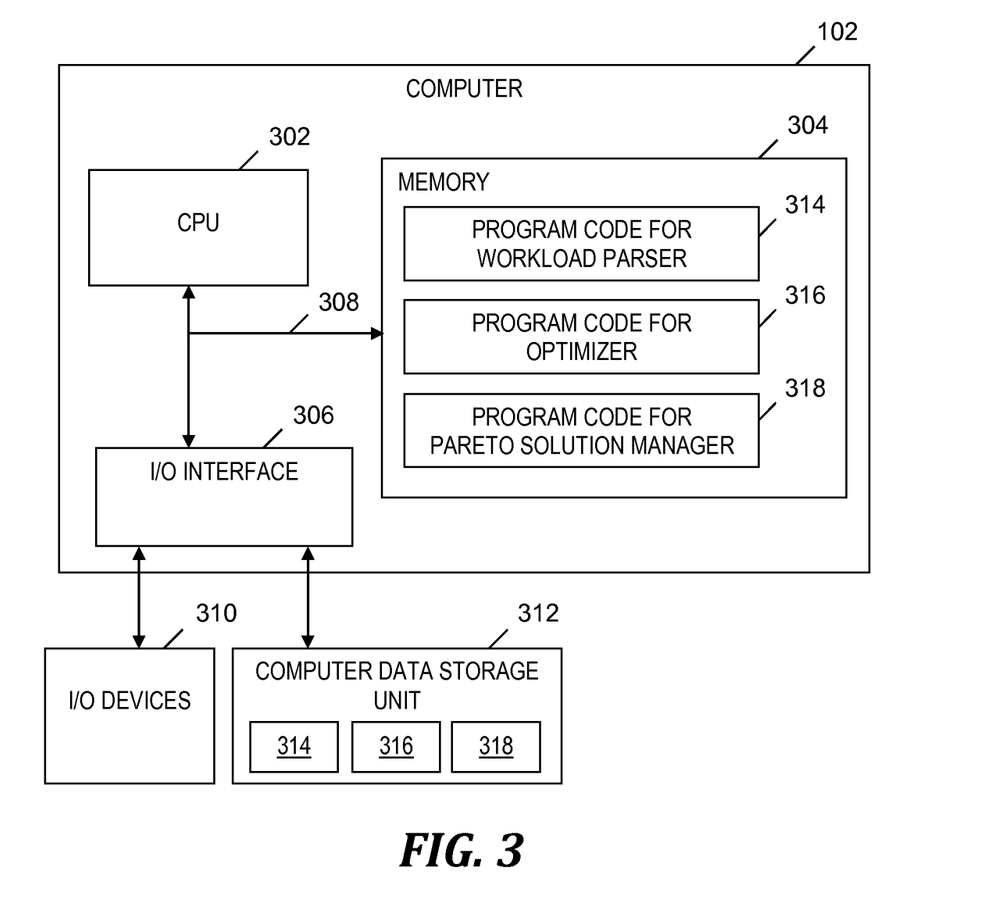
FIG. 3 is a block diagram of a computer that is included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for System for Determining Server Level Availability Based on a Workload Level Availability Requirement FIG. 2 is a flowchart of a process of determining availabilities of servers in multiple tiers of a workload, where the process is implemented in the system of FIG. 1, in accordance with embodiments of the present invention. The process of FIG. 2 begins at step 200. In step 202, GUI 104 (see FIG. 1) receives a requirement of an availability of a workload (i.e., receives a workload availability requirement). In one embodiment, the workload level availability requirement is included in constraints 106 (see FIG. 1), which is received by GUI 104 (see FIG. 1).

In step 204, GUI 104 (see FIG. 1) receives from each of multiple cloud sites 1, ..., K minimum throughput or resource requirements for respective redundancy groups included in the workload. The resource requirements are based on relative performance estimates of the server(s) in the redundancy groups.

In step 206, GUI 104 (see FIG. 1) receives options oft-shirt sizes and availability categories (i.e., categories of availability of the server(s) included in each of the redundancy groups) that are offered by each of the multiple cloud sites 1, ..., K for the redundancy groups in the workload. The information received in steps 204 and 206 is included in information 108-1, ..., 108-K (see FIG. 1). The t-shirt sizes include respective numbers of CPUs in the server(s) in each of the redundancy groups, respective sizes of data storage devices coupled to the CPUs, and respective sizes of memories coupled to the CPUs. The availability categories specify durations for which the servers are operational over a specified amount of time.

After step 206 and prior to step 208, workload parser 110 (see FIG. 1) parses out the information received in steps 202, 204, and 206 so that the information can be utilized by optimizer 112 (see FIG. 1).

In step 208, based on the information received in steps 202, 204, and 206 and parsed by workload parser 110 (see FIG. 1), optimizer 112 (see FIG. 1) determines an objective function of an optimization problem to minimize the cost of achieving the workload level availability requirement received in step 202. The objective function is either built into optimizer 112 (see FIG. 1) or provided as input by a user of system 100 (see FIG. 1).

In step 210, based on the information received in steps 202, 204, and 206 and parsed by workload parser 110 (see FIG. 1), optimizer 112 (see FIG. 1) determines and adds availability constraints and resource constraints to the optimization problem.

In step 212, using heuristics (not shown), optimizer 112 (see FIG. 1) determines feasible solutions 114 (see FIG. 1) of the optimization problem, where each of the solutions 114 (see FIG. 1) achieves the workload level availability requirement. Each of the solutions 114 (see FIG. 1) indicates the cloud site to host the workload, the total number of servers in each redundancy group in the workload, the t-shirt sizes of the server(s) in each of the redundancy groups, the availability categories of the server(s) in each of the redundancy groups, and the number of servers in a subset of the total number of servers in each redundancy group that must be active in order for the redundancy group to be considered to be available.

In one embodiment, optimizer 112 (see FIG. 1) begins a process of determining solutions 114 (see FIG. 1) in step 212, which begins by assigning the availability of a workload to A in expression (2) presented below and determining an upper bound for A which is specified in expression (3) presented below:

$$A = \text{Availability of workload having L redundancy groups} \quad (2)$$

$$A \leq P(\text{the } L \text{ redundancy groups are available}) \quad (3)$$

Expression (4) presented below follows expression (3) by an assumption of independence among the availability of the redundancy groups:

$$A \leq \Pi_{i=1}^{L} P(\text{redundancy group } i \text{ is available}) \quad (4)$$

Since each number on the right hand side of expression (4) is ≤1, expression (5) presented below follows from expression (4):

$$A^{1/L} \leq P(\text{redundancy group } i \text{ is available}) \quad (5)$$

Expressions (2) through (5) presented above allows optimizer 112 (see FIG. 1) to consider each individual redundancy group separately in solving the optimization problem.

The process of determining solutions 114 (see FIG. 1) continues with optimizer 112 (see FIG. 1) determining an objective function (6) presented below, which utilizes the variables and notation presented below:

Integer Variables that are Unknown:

Let $n_{ji}$ be the number of servers with availability option i and t-shirt size j.

Let $1 \leq j \leq T$ and $1 \leq i \leq S$.

Let N be the number of servers in a redundancy group (RG) included in the workload.

Let M be the number of servers out of the N servers that must be active in order for the RG to be considered to be available.

Notation:

Let A be the total availability requirement for the workload which has L redundancy groups.

Let RPE be the minimum capacity based on the Relative Server Performance Estimate 2 (RPE2) or an equivalent benchmark required to exist in a redundancy group included in the workload.

Let $RPE_j$ be the capacity of a t-shirt size j.

Let $P_{ji}(N)$ be the price or cost of choosing a server with the i-th availability option with t-shirt size j. For example, the cost may be expressed as cost per VM per month. In one embodiment, $P_{ji}(N)$ depends on the number of servers.

Let C(N) be any additional cost of operation with N servers. For example, the cost of managing the software running on the servers may be an additional cost, which may be dependent on the number of servers.

Let $f_{ji}$ be the probability of a failure of a server and the server's associated software stack, where the server has the i-th availability option and the t-shirt size j. It is assumed that $f_{ji}$ is the cumulative failure probability of the entire software stack. The $f_{ji}$ probability is provided as an input and in one embodiment is an estimate based on previous experience or calculations that take into account the SLA provided by the cloud computing service provider for the i-th availability option.

Let U be the maximum value of N for a redundancy group.

Objective Function:

$$\text{minimize } \Sigma_{j,i} P_{ji} n_{ji} + C(N) \text{ subject to } \Sigma_{j,i} n_{ji} = N \quad (6)$$

In determining objective function (6) presented above, each server in a redundancy group is assigned one and only one availability option i and t-shirt size j.

After determining objective function (6), optimizer 112 (see FIG. 1) determines the following availability constraint and resource constraint, which utilize the variables and notation described above.

The availability constraint is based on M out of N servers being required to be available if the redundancy group is considered to be available.

Availability Constraint:

$$1 - (\Sigma_{F=M}^{N} \Sigma_{\{(m_{11},\ldots,m_{TS}): m_{ji} \leq n_{ji}; \Sigma_{j,i} m_{ji} = F\}} \Pi_{j,i} n_{ji} C_{m_{ji}} f_{ji}^{m_{ji}} (1-f_{i})^{n_{ji}-m_{ji}}) \geq A^{1/L}$$

The term on the left hand side of the availability constraint presented above is the probability that the M out of N system is available and that probability is lower bounded by $A^{1/L}$.

The resource constraint is based on the average resource allocation is greater than RPE when the servers available is ≥M.

Resource Constraint:

$$(\Sigma_{A=M}^{N} \Sigma_{\{(m_{11},\ldots,m_{TS}): m_{ji} \leq n_{ji}; \Sigma_{j,i} m_{ji} = A\}} \Pi_{j,i} n_{ji} C_{m_{ji}} f_{ji}^{n_{ji}-m_{ji}} (1-f_{i})^{m_{ji}} \Sigma_{j,i} RPE_{j} m_{ji}) \geq RPE$$

Optimizer 112 (see FIG. 1) adds the aforementioned availability and resource constraints to the optimization problem, which causes the determination of the M out of N in the optimization problem to be a non-linear integer program. Because an optimization problem having a non-linear integer program is typically NP hard, optimizer 112 (see FIG. 1) utilizes a heuristics-based technique to generate solutions 114 (see FIG. 1). Heuristic-based techniques include linear programming (LP) relaxation, Simulated Annealing, Monte Carlo approach, Branch and Bound (BB), etc.

For example, optimizer 112 (see FIG. 1) uses a Monte Carlo approach to generate solutions 114 (see FIG. 1) in the steps presented below:

1. Optimizer 112 (see FIG. 1) generates a vector of unknown parameters, which include M, N, $n_{ji}$, and $m_{ji}$. For example, the vector is (M, N, $n_{ji}$).

2. Optimizer 112 (see FIG. 1) defines domains for the unknown parameters in a one-to-one correspondence. For example, the following domains are defined for the vector of unknown parameters (M, N, $n_{ji}$): N∈{0, 1, 2, . . . , U}; M∈{0, 1, 2, . . . , N}; $n_{ji}$∈{0, 1, . . . , N}

3. Optimizer 112 (see FIG. 1) utilizes a sampling plugin to repeatedly and randomly generate sample vectors using the domains defined in step 2 to form a set K of sample vectors.

4. Optimizer 112 (see FIG. 1) determines objective functions for respective sample vectors in set K, and determines whether each sample vector violates the constraints 106 (see FIG. 1). If a sample vector violates constraints 106 (see FIG. 1), then optimizer 112 (see FIG. 1) discards the sample vector from set K because the sample vector is infeasible; otherwise, optimizer 112 (see FIG. 1) keeps the sample vector in set K.

5. Optimizer 112 (see FIG. 1) graphically plot the sample vectors in set K to assist the user in performing Pareto analysis (see step 214 presented below). Based on the objective functions corresponding to the sample vectors in set K, optimizer 112 (see FIG. 1) determines the optimal set or non-dominated set of sample vectors that are included in set K.

In step 214, Pareto solution manager 116 (see FIG. 1) presents solutions 114 (see FIG. 1) in Pareto analysis 118 (see FIG. 1) displayed by GUI 104 (see FIG. 1), so that at user can review Pareto analysis 118 (see FIG. 1) and select one of the solutions 114 (see FIG. 1) to achieve the workload level availability requirement. In one embodiment, Pareto solution manager 116 (see FIG. 1) tracks user preferences in user choices of solutions in previous performances of the method of FIG. 2 and based on the tracked user preferences, orchestrates interaction with the user via Pareto analysis 118 (see FIG. 1).

Step 216 is performed after the user reviews and compares the solutions displayed in GUI 104 (see FIG. 1) by analyzing the tradeoffs associated with the solutions. In step 216, GUI 104 (see FIG. 1) receives the user selection of one of the solutions 114 (see FIG. 1). If the user requests optimizer 112 (see FIG. 1) to refine the selected solution, then GUI 104 (see FIG. 1) receives and forwards the user request to optimizer 112 (see FIG. 1) via a solution parser (not shown). In response to forwarding the request, the solution parser parses the parameters needed for the optimization problem from the selected solution and forwards the parsed parameters to optimizer 112 (see FIG. 1), which then computes a superior solution as a refinement of the selected solution. The process of FIG. 2 ends at step 218.

In an alternate embodiment, if the optimization problem is a scalarized objective function, steps 212, 214 and 216 are replaced with Pareto solution manager 116 (see FIG. 1) determining a single solution of the optimization problem that achieves the workload level availability requirement, where the solution includes the cloud site to host the workload, the t-shirt sizes to be allocated to the servers, the availability categories to be allocated to the servers, the number of servers in each of the RGs, the number m servers out n servers in each RG that must be active in order for the RG to be considered available.

Computer System

FIG. 3 is a block diagram of a computer that is included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for workload parser 110 (see FIG. 1), program code 316 for optimizer 112 (see FIG. 1), and program code 318 for Pareto solution manager 116 (see FIG. 1) to perform a method of determining server level availability and resource allocation based on a workload level availability requirement, where the instructions are executed by CPU 302 via memory 304. CPU 302 may include a single processing unit, or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314, 316, 318) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display device, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314, 316, 318) on and retrieve the information from computer data storage unit 312 or another computer data storage unit (not shown). Computer data storage unit 312 includes a known computer-readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314, 316, 318 that includes instructions that are executed by CPU 302 via memory 304 to determine server level availability and resource allocation based on a workload level availability requirement. Although FIG. 3 depicts memory 304 as including program code 314, 316, 318, the present invention contemplates embodiments in which memory 304 does not include all of code 314, 316, 318 simultaneously, but instead at one time includes only a portion of code 314, 316, 318.

Further, memory 304 may include an operating system (not shown) and may include other systems not shown in FIG. 3.

Storage unit 312 and/or one or more other computer data storage units (not shown) that are coupled to computer 102 may store any combination of: constraints 106 (see FIG. 1), solutions 114 (see FIG. 1), Pareto analysis 118 (see FIG. 1), and availability plan 120 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to determining server level availability and resource allocation based on a workload level availability requirement. Thus, an embodiment of the present invention discloses a process for supporting computer infrastructure, where the process includes providing at least one support service for at least one of integrating, hosting, maintaining and deploying computer-readable code (e.g., program code 314, 316, 318) in a computer system (e.g., computer 102) including one or more processors (e.g., CPU 302), wherein the processor(s) carry out instructions contained in the code causing the computer system to determine server level availability and resource allocation based on a workload level availability requirement. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of determining server level availability and resource allocation based on a workload level availability requirement.

While it is understood that program code 314, 316, 318 for determining server level availability and resource allocation based on a workload level availability requirement may be deployed by manually loading directly in client, server and proxy computers (not shown) via loading a computer-readable storage medium (e.g., computer data storage unit 312), program code 314, 316, 318 may also be automatically or semi-automatically deployed into computer 102 by sending program code 314, 316, 318 to a central server or a group of central servers. Program code 314, 316, 318 is then downloaded into client computers (e.g., computer 102) that will execute program code 314, 316, 318. Alternatively, program code 314, 316, 318 is sent directly to the client computer via e-mail. Program code 314, 316, 318 is then either detached to a directory on the client computer or loaded into a directory on the client computer by a button on the e-mail that executes a program that detaches program code 314, 316, 318 into a directory. Another alternative is to send program code 314, 316, 318 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314, 316, 318 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of determining server level availability and resource allocation based on a workload level availability requirement. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 304 and computer data storage unit 312) having computer readable program instructions 314, 316, 318 thereon for causing a processor (e.g., CPU 302) to carry out aspects of the present invention.

The computer readable storage medium can be a tangible device that can retain and store instructions (e.g., program code 314, 316, 318) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314, 316, 318) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314, 316, 318) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314, 316, 318).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314, 316, 318) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining availabilities of servers in multiple tiers of a workload, the method comprising the steps of:

a computer receiving a requirement of an availability of the workload that includes a plurality of redundancy groups (RGs), each RG including one or more of the servers, and each of the servers being included in exactly one corresponding RG included in the plurality of RGs;

the computer receiving resource requirements for respective RGs included in the plurality of RGs, the resource requirements being based on respective relative performance estimates of the servers;

the computer receiving sets of server sizes and sets of categories of availability, the server sizes including respective numbers of central processing units (CPUs) in the servers, respective sizes of data storage devices coupled to the CPUs, and respective sizes of memories coupled to the CPUs, and the categories of availability specifying durations for which the servers are operational over a specified amount of time;

the computer determining an objective function of an optimization problem which minimizes a cost of achieving the requirement of the availability of the workload, the optimization problem including the requirement of the availability of the workload, the resource requirements for the respective RGs, the sets of server sizes, and the sets of categories of availability;

the computer determining an availability constraint based on a number (M) of servers out of a total number (N) of servers in a given RG being required to be available so that the given RG is available;

the computer determining a resource requirement based on an average resource allocation being greater than the relative performance estimates in response to the servers that are available being greater than or equal to M;

the computer generating a non-linear integer program by adding the availability and resource constraints to the optimization problem;

the computer performing a Monte Carlo approach on the non-linear integer program and in response thereto, generating feasible solutions of the optimization problem, a given feasible solution including a cloud site hosting the workload, a total number of servers in an RG, server sizes of the servers in the RG, categories of availability of the servers in the RG, and a number of servers out of the total number of servers in the RG which is required to be active for the RG to be available; and the computer minimizing a cost of achieving the requirement of the availability of the workload by performing a Pareto analysis of the feasible solutions.

2. The method of claim 1, further comprising the steps of:
the computer determining numbers of server(s) included in respective RGs;
the computer selecting one of the sets of server sizes;
the computer determining allocations of one or more server sizes;
the computer selecting one of the sets of categories of availability; and
the computer determining allocations of one or more categories of availability, wherein the step of minimizing the cost of achieving the requirement of the availability of the workload is based on the number of server(s) included in the respective RGs, the selected one of the sets of server sizes, the allocations of the one or more server sizes, the selected one of the sets of categories of availability, and the allocations of the one or more categories of availability.

3. The method of claim 1, further comprising based on the requirement of the availability of the workload, the resource requirements, the sets of server sizes, and the sets of availability categories, the computer selecting the cloud site from a plurality of cloud sites so that the selected cloud site hosts the workload.

4. The method of claim 1, further comprising the steps of:
the computer receiving constraints including a minimum availability required for a server included in the servers; and
the computer determining an allocation of a category of availability to the server based in part on the minimum availability.

5. The method of claim 1, further comprising the steps of:
the computer determining a sum of the relative performance estimates of the servers is greater than a threshold value; and
based on the relative performance estimates of the servers being greater than the threshold value, the computer (i)

determining numbers of the server(s) included in respective RGs, (ii) selecting one of the sets of server sizes, (iii) determining allocations of the one or more server sizes from the selected set of server sizes, (iv) selecting one of the sets of categories of availability, and (v) determining allocations of one or more categories of availability from the selected set of categories of availability.

6. The method of claim 1, further comprising the steps of:
the computer receiving an availability constraint which specifies that m servers out of n servers in an RG are required to be active for the RG to be available, the RG included in the plurality of RGs; and
based on the m servers out of n servers in the RG being required to be active for the RG to be available, the computer determining numbers of server(s) included in respective RGs included in the plurality of RGs, selecting one of the sets of server sizes, determining allocations of one or more server sizes, selecting one of the sets of categories of availability, and determining allocations of the one or more categories of availability.

7. The method of claim 1, further comprising the step of:
the computer receiving a selection of one of the feasible solutions, the selection being provided by a cloud site included in a plurality of cloud sites.

8. A computer program product, comprising:
a computer-readable storage device; and
a computer-readable program code stored in the computer-readable storage device, the computer-readable program code containing instructions that are executed by a central processing unit (CPU) of a computer system to implement a method of determining availabilities of servers in multiple tiers of a workload, the method comprising the steps of:
the computer system receiving a requirement of an availability of the workload that includes a plurality of redundancy groups (RGs), each RG including one or more of the servers, and each of the servers being included in exactly one corresponding RG included in the plurality of RGs;
the computer system receiving resource requirements for respective RGs included in the plurality of RGs, the resource requirements being based on respective relative performance estimates of the servers;
the computer system receiving sets of server sizes and sets of categories of availability, the server sizes including respective numbers of central processing units (CPUs) in the servers, respective sizes of data storage devices coupled to the CPUs, and respective sizes of memories coupled to the CPUs, and the categories of availability specifying durations for which the servers are operational over a specified amount of time;
the computer system determining an objective function of an optimization problem which minimizes a cost of achieving the requirement of the availability of the workload, the optimization problem including the requirement of the availability of the workload, the resource requirements for the respective RGs, the sets of server sizes, and the sets of categories of availability;
the computer system determining an availability constraint based on a number (M) of servers out of a total number (N) of servers in a given RG being required to be available so that the given RG is available;
the computer system determining a resource requirement based on an average resource allocation being greater than the relative performance estimates in response to the servers that are available being greater than or equal to M;
the computer system generating a non-linear integer program by adding the availability and resource constraints to the optimization problem;
the computer system performing a Monte Carlo approach on the non-linear integer program and in response thereto, generating feasible solutions of the optimization problem, a given feasible solution including a cloud site hosting the workload, a total number of servers in an RG, server sizes of the servers in the RG, categories of availability of the servers in the RG, and a number of servers out of the total number of servers in the RG which is required to be active for the RG to be available; and
the computer system minimizing a cost of achieving the requirement of the availability of the workload by performing a Pareto analysis of the feasible solutions.

9. The computer program product of claim 8, wherein the method further comprises the steps of:
the computer system determining numbers of server(s) included in respective RGs;
the computer system selecting one of the sets of server sizes;
the computer system determining allocations of one or more server sizes;
the computer system selecting one of the sets of categories of availability; and
the computer system determining allocations of one or more categories of availability, wherein the step of minimizing the cost of achieving the requirement of the availability of the workload is based on the number of server(s) included in the respective RGs, the selected one of the sets of server sizes, the allocations of the one or more server sizes, the selected one of the sets of categories of availability, and the allocations of the one or more categories of availability.

10. The computer program product of claim 8, wherein the method further comprises based on the requirement of the availability of the workload, the resource requirements, the sets of server sizes, and the sets of availability categories, the computer system selecting the cloud site from a plurality of cloud sites so that the selected cloud site hosts the workload.

11. The computer program product of claim 8, wherein the method further comprises the steps of:
the computer system receiving constraints including a minimum availability required for a server included in the servers; and
the computer system determining an allocation of a category of availability to the server based in part on the minimum availability.

12. The computer program product of claim 8, wherein the method further comprises the steps of:
the computer system determining a sum of the relative performance estimates of the servers is greater than a threshold value; and
based on the relative performance estimates of the servers being greater than the threshold value, the computer system (i) determining numbers of the server(s) included in respective RGs, iii) selecting one of the sets of server sizes, (iii) determining allocations of one or more server sizes from the selected set of server sizes, (iv) selecting one of the sets of categories of availability, and (v) determining allocations of one or more categories of availability from the selected set of categories of availability.

13. A computer system comprising:
a central processing unit (CPU);
a memory coupled to the CPU; and
a computer-readable storage device coupled to the CPU, the storage device containing instructions that are executed by the CPU via the memory to implement a method of determining availabilities of servers in multiple tiers of a workload, the method comprising the steps of:
the computer system receiving a requirement of an availability of the workload that includes a plurality of redundancy groups (RGs), each RG including one or more of the servers, and each of the servers being included in exactly one corresponding RG included in the plurality of RGs;
the computer system receiving resource requirements for respective RGs included in the plurality of RGs, the resource requirements being based on respective relative performance estimates of the servers;
the computer system receiving sets of server sizes and sets of categories of availability, the server sizes including respective numbers of central processing units (CPUs) in the servers, respective sizes of data storage devices coupled to the CPUs, and respective sizes of memories coupled to the CPUs, and the categories of availability specifying durations for which the servers are operational over a specified amount of time;
the computer system determining an objective function of an optimization problem which minimizes a cost of achieving the requirement of the availability of the workload, the optimization problem including the requirement of the availability of the workload, the resource requirements for the respective RGs, the sets of server sizes, and the sets of categories of availability;
the computer system determining an availability constraint based on a number (M) of servers out of a total number (N) of servers in a given RG being required to be available so that the given RG is available;
the computer system determining a resource requirement based on an average resource allocation being greater than the relative performance estimates in response to the servers that are available being greater than or equal to M;
the computer system generating a non-linear integer program by adding the availability and resource constraints to the optimization problem;
the computer system performing a Monte Carlo approach on the non-linear integer program and in response thereto, generating feasible solutions of the optimization problem, a given feasible solution including a cloud site hosting the workload, a total number of servers in an RG, server sizes of the servers in the RG, categories of availability of the servers in the RG, and a number of servers out of the total number of servers in the RG which is required to be active for the RG to be available; and
the computer system minimizing a cost of achieving the requirement of the availability of the workload by performing a Pareto analysis of the feasible solutions.

14. The computer system of claim 13, wherein the method further comprises the steps of:
the computer system determining numbers of server(s) included in respective RGs;
the computer system selecting one of the sets of server sizes;
the computer system determining allocations of one or more server sizes;
the computer system selecting one of the sets of categories of availability; and
the computer system determining allocations of one or more categories of availability, wherein the step of minimizing the cost of achieving the requirement of the availability of the workload is based on the number of server(s) included in the respective RGs, the selected one of the sets of server sizes, the allocations of the one or more server sizes, the selected one of the sets of categories of availability, and the allocations of the one or more categories of availability.

15. The computer system of claim 13, wherein the method further comprises based on the requirement of the availability of the workload, the resource requirements, the sets of server sizes, and the sets of availability categories, the computer system selecting the cloud site from a plurality of cloud sites so that the selected cloud site hosts the workload.

16. The computer system of claim 13, wherein the method further comprises the steps of:
the computer system receiving constraints including a minimum availability required for a server included in the servers; and
the computer system determining an allocation of a category of availability to the server based in part on the minimum availability.

* * * * *